United States Patent
Shigesada et al.

(10) Patent No.: US 7,147,814 B1
(45) Date of Patent: Dec. 12, 2006

(54) INJECTION MOLDING METHOD AND INJECTION MOLD

(75) Inventors: Keiji Shigesada, Kanagawa (JP); Seiichi Watanabe, Kanagawa (JP); Naoyoshi Chino, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/622,360

(22) PCT Filed: Feb. 8, 1999

(86) PCT No.: PCT/JP99/00522

§ 371 (c)(1),
(2), (4) Date: Aug. 16, 2000

(87) PCT Pub. No.: WO99/43486

PCT Pub. Date: Sep. 2, 1999

(30) Foreign Application Priority Data

Feb. 25, 1998 (JP) .................................. 10-043731

(51) Int. Cl.
*B29C 45/17* (2006.01)
(52) U.S. Cl. .................... 264/155; 264/161; 264/328.7
(58) Field of Classification Search ................ 425/577, 425/562, 566, 572, 556; 264/328.7, 154, 264/155, 161
See application file for complete search history.

(56) References Cited

U.S. PATENT DOCUMENTS

| 429,995 | A | | 6/1890 | Bradford ..................... 160/328 |
| 2,698,464 | A | * | 1/1955 | Wilson ..................... 264/37.33 |
| 3,647,338 | A | * | 3/1972 | Ise ............................. 425/567 |
| 3,989,436 | A | * | 11/1976 | McNeely et al. ........... 425/572 |
| 4,820,149 | A | * | 4/1989 | Hatakeyama et al. ........ 425/555 |
| 5,340,303 | A | * | 8/1994 | Maus et al. .................. 425/549 |
| 5,460,508 | A | * | 10/1995 | Ohno et al. .................. 425/554 |
| 5,472,334 | A | * | 12/1995 | Takahashi .................... 425/554 |
| 5,545,365 | A | * | 8/1996 | Asai ........................ 264/328.7 |
| 5,552,098 | A | * | 9/1996 | Kudo et al. .................. 264/106 |
| 5,690,974 | A | | 11/1997 | Miyairi ........................ 425/577 |
| 5,868,978 | A | * | 2/1999 | Kadoriku et al. ........... 264/40.5 |

FOREIGN PATENT DOCUMENTS

EP          0 620 097 A          10/1994

(Continued)

OTHER PUBLICATIONS

International Search Report.

(Continued)

*Primary Examiner*—Joseph S. Del Sole
*Assistant Examiner*—Emmanuel S. Luk
(74) *Attorney, Agent, or Firm*—Sughrue Mion, PLLC

(57) ABSTRACT

An injection molding method and an injection mold used therefor are provided, in which a molded product free from burrs, whitening and gate marks can be obtained with a simple structure mold, and it can adequately serve the needs for multicavity molding as well. In the injection molding method, molten resin material is introduced and charged into a resin reservoir and a molding cavity of an injection mold, where a depth of the resin reservoir is larger than a thickness of a communicating portion. A cut punch is moved, when a portion of the resin material in the resin reservoir is still molten, to push the molten resin in the resin reservoir back from a gate into a runner so that the cut punch not only closes the communicating portion but also cuts a resin solidified portion in the resin reservoir away from a resin molded product in the molding cavity at the communicating portion.

9 Claims, 10 Drawing Sheets

FOREIGN PATENT DOCUMENTS

| | | |
|---|---|---|
| EP | 0 620 097 A1 | 10/1994 |
| JP | 55-15834 | 2/1980 |
| JP | 58-158231 | 9/1983 |
| JP | 1-99821 | 4/1989 |
| JP | 2-67115 | 3/1990 |
| JP | 2-198816 | 8/1990 |
| JP | 5-285994 | 11/1993 |
| JP | 6-143364 | 5/1994 |
| JP | 6-278177 | 10/1994 |
| JP | 07-027821 | 5/1995 |
| JP | 7-276437 | 10/1995 |
| JP | 08-020050 | 1/1996 |
| JP | 8-142128 | 4/1996 |
| JP | 08-156038 | 6/1996 |
| JP | 08-183074 | 7/1996 |
| JP | 8-294944 | 11/1996 |
| JP | 9-262880 | 10/1997 |

OTHER PUBLICATIONS

Patent Abstracts of Japan vol. 18, No. 65 Feb. 3, 1994.
Patent Abstracts of Japan vol. 14, No. 488 Oct. 24, 1990.
Patent Abstracts of Japan vol. 98, No. 2 Jan. 30, 1998.
Patent Abstracts of Japan vol. 18, No. 452 Aug. 23, 1994.
Japanese Utitlity Model Application No. 2-45558 (JP 4-5919U).

* cited by examiner

INJECTION MOLDING METHOD AND INJECTION MOLD

TECHNICAL FIELD

The present invention relates to an injection molding method and an injection mold.

BACKGROUND ART

Injection molding methods have heretofore been used as a molding method for producing resin molded products. It is well known that an injection molding method is a method involving the steps of: forming a cavity between a fixed die and a movable die; charging a molten thermoplastic resin material from a gate provided on part of the cavity by injection; and solidifying the thermoplastic resin material into a predetermined shape corresponding to a space in the cavity to obtain a resin molded product; and taking the resin molded product out.

Further, injection molds used in injection molding methods come in two types: one having means for heating part of a runner that introduces a molten resin material into a cavity from an injection molding apparatus, and the other not having such means. It is also well known that a method using the former type of mold having the heating means is called a hot runner system and that a method using the latter type of mold not having the heating means is called a cold runner system.

By the way, immediately after the end of an injection molding process based on the cold runner system, a resin molded product formed in the cavity and a resin portion solidified in the runner are in one piece. Therefore, the resin molded product and the solidified resin portion in the runner must be cut into separate pieces at a gate portions and thus some kind of mechanical cutting means is usually provided in the mold.

On the other hand, the injection molding method based on the hot runner system has a mold structure so that the resin in the runner can be kept molten. Therefore, the cutting means is not generally required. However, to fabricate a molded product having an opening in its part, it is preferred not to form weld lines (lines formed in the cavity by the confluence of molten resin portions flowing in different directions, and it is desirable to minimize the formation of such lines from the viewpoints of external appearance and mechanical strength). To prevent the formation of weld lines, it is desired that molding be done using a mold in which the gate is previously provided so as to correspond to an opening forming portion and that the portion be thereafter cut away to form the opening. In this case, even the hot runner system must have mechanical cutting means similarly to the cold runner system.

Thus, irrespective of the systems, whether it is the cold runner system or the hot runner system, various types of methods and molds that involve the cutting operation are proposed in injection molding methods. For example, Japanese Patent Application Laid-open No. Sho 55-15834 proposes a molding method for obtaining a ring-like molded product. In this molding method, a molten resin is charged into a cavity through a sprue bush, and then the sprue bush is retracted as a cut pin for cutting a solidified resin portion near a gate portion moves forward, so that the gate portion is sheared to separate a subrunner from a resin molded product. Further, Japanese Patent Application Laid-open No. Hei 6-278177 proposes a method that provides a second bush. In this method, a cut bush for cutting a solidified resin portion near a gate portion is moved forward, and in synchronism with such forward movement of the cut bush, the second bush retracts from a cavity in such a manner as to mechanically absorb an amount of resin pushed out by the cut bush. Still further, Japanese Patent Application Laid-open No. Hei 2-67115 proposes a mold that cuts a number of disk gates. That is, not only a sprue bush is operated while interlocked with the movement of a fixed die away from a fixed table, but also a punch cutter provided on a movable die is projected, so that a number of disk gates are cut.

Furthermore, Japanese Patent Application Laid-open No. Sho 58-158231 proposes a method for separating a molded product from a disk gate formed in a cavity. That is, in a gate portion within the cavity, a gate cutting blade provided on a movable die so as to face the inner surface of a fixed die is operated to bring a front end of the blade into contact with the fixed die, so that the gate disk is cut away.

Furthermore, Japanese Patent Application Laid-open No. Hei 8-294944 proposes a method for obtaining a resin molded product having an opening at a central portion. In this method, a specially shaped core pin having an external shape corresponding to the opening of the molded product is caused to shuttle between a first position and a second position. The first position stops at a gate a flow of molten resin injected into a hot runner. The second position opens the gate to introduce the molten resin into a cavity, and is located at the opening portion that is the center of axis corresponding to a disk gate portion. Moreover, Japanese Patent Application Laid-open No. Hei 7-276437 proposes a method for obtaining a resin molded product having an opening at the center of axis. In this method, a fixed pin is slidably provided in a hot runner provided in a fixed die and serves also as a hot gate, and a movable pin is provided on a movable die so as to be slidable in correspondence with the fixed pin and has a distal end formed so that the distal end engages with and abuts against a distal end of the fixed pin so as to be connected to and disconnected from the distal end of the fixed pin. The distal end of the fixed pin and that of the movable pin are engaged with and abutted against each other in the cavity so as to correspond to the opening portion of the molded product, so that the resin molded product having the opening at the center of axis is obtained.

Still further, Japanese Patent Application Laid-open No. Hei 1-99821 proposes a method for cutting a gate portion using a sleeve-like cutter that is driven toward a fixed die from a movable die after a resin material charged into a cavity has substantially solidified and before a resin portion at the gate portion completely solidifies.

However, the methods and mold disclosed in Japanese Patent Application Laid-opens Nos. Sho 55-15834, Hei 6-278177 and Hei 2-67115 are based on the concept that complicates the mold structure in order to achieve the above object, and thus elevates the cost and is highly likely to impair mechanical reliability. Further, if such methods and mold are applied to multicavity molds, the structure becomes further complicated. Thus, one can easily guess that the cost increases and the mechanical reliability impairs significantly.

Still further, the method disclosed in Japanese Patent Application Laid-open No. 58-158231 proposes the use of a simply structured mold, but imposes not only a problem that the gate cutting blade comes in contact with the mold when cutting the gate portion, and thus has difficulty stably cutting a solidified film layer of the resin material, but also a problem that the fixed die could be damaged by the gate cutting blade abutting against the mold strongly.

The methods disclosed in Japanese Patent Application Laid-open Nos. Hei 8-294944 and Hei 7-276437 impose a problem that the molds are expensive since both methods require an exclusive valve gate system having specially shaped or structured pins. The methods also impose, e.g., a problem that burrs are likely to be produced at a punched portion since an opening is punched before the gate portion solidifies.

Still further, the method disclosed in Japanese Patent Application Laid-open No. 1-99821 proposes a simply structured mold, but imposes a problem that the method is effective when there is an amount of resin plenty enough to absorb the driving stroke of the sleeve-like cutter at the disk gate portion, but if the volume of the disk gate portion is relatively small, the cutter is hard to drive and thus the method is not applicable.

DISCLOSURE OF THE INVENTION

Therefore, an object of the present invention is to provide an injection molding method that can obtain a molded product free from burrs, whitening and gate marks using a simply structured mold, and that can adequately serve the needs for multicavity molding.

Further, another object of the present invention is to provide an injection mold beneficially applicable to the aforementioned molding method.

To overcome the aforementioned problems, one aspect of the present invention provides an injection molding method wherein a molten resin material, which is injected into a cavity defined by a fixed die and a movable die via a runner provided in the fixed die, is introduced from a gate provided in the fixed die and is molded, and the method is characterized in that:

when the molten resin material is being charged into the cavity through the resin reservoir from the gate, a cut punch, which is provided on the side of the movable die that confronts the gate through a resin reservoir formed by recessing the fixed die toward the gate and which is movably provided so that the cut punch is inserted into the resin reservoir so as to be in slidable contact with the resin reservoir, has a distal end thereof extending in a moving direction thereof that is toward the resin reservoir, and the distal end is located between the resin reservoir and the cavity at such a position as to open a communicating portion that allows the resin reservoir and the cavity to communicate with each other so that the molten resin material is introduced into the cavity via the resin reservoir; and when the resin material that is still molten is present in the resin reservoir after the molten resin material has been charged into the cavity and the resin reservoir, the cut punch moves toward the gate so that the cut punch is inserted into the resin reservoir, whereby the cut punch not only closes the communicating portion while forcibly pushing the still molten resin material present in the resin reservoir back into the gate, but also cuts the resin material at the communicating portion so that a resin molded product formed in the cavity is separated from a resin solidified portion formed in the resin reservoir.

Further, another aspect of the present invention provides an injection mold wherein a fixed die and a movable die form a cavity into which a molten resin material injected via a runner provided in the fixed die is introduced from a gate provided in the fixed die, and the mold is characterized in that:

the gate is connected to the cavity through a resin reservoir formed by recessing the fixed die toward the gate;

a cut punch is provided on the side of the movable die that confronts the gate through the resin reservoir, the cut punch being movable so that the cut punch can be inserted into the resin reservoir so as to be in slidable contact with the resin reservoir;

when the molten resin material is being charged into the cavity, a distal end of the cut punch extending in a moving direction of the cut punch that is toward the resin reservoir is located between the resin reservoir and the cavity at such a position as to open a communicating portion that allows the resin reservoir and the cavity to communicate with each other so that the molten resin material is introduced into the cavity via the resin reservoir; and when the resin material that is still molten is present in the resin reservoir after the molten resin material has been charged into the cavity and the resin reservoir, the cut punch moves toward the gate so that the cut punch is inserted into the resin reservoir, whereby the cut punch not only closes the communicating portion while forcibly pushing the still molten resin material present in the resin reservoir back into the gate, but also cuts the resin material at the communicating portion so that a resin molded product formed in the cavity is separated from a resin solidified portion formed in the resin reservoir.

BEST MODES FOR CARRYING OUT THE INVENTION

Figure 1:
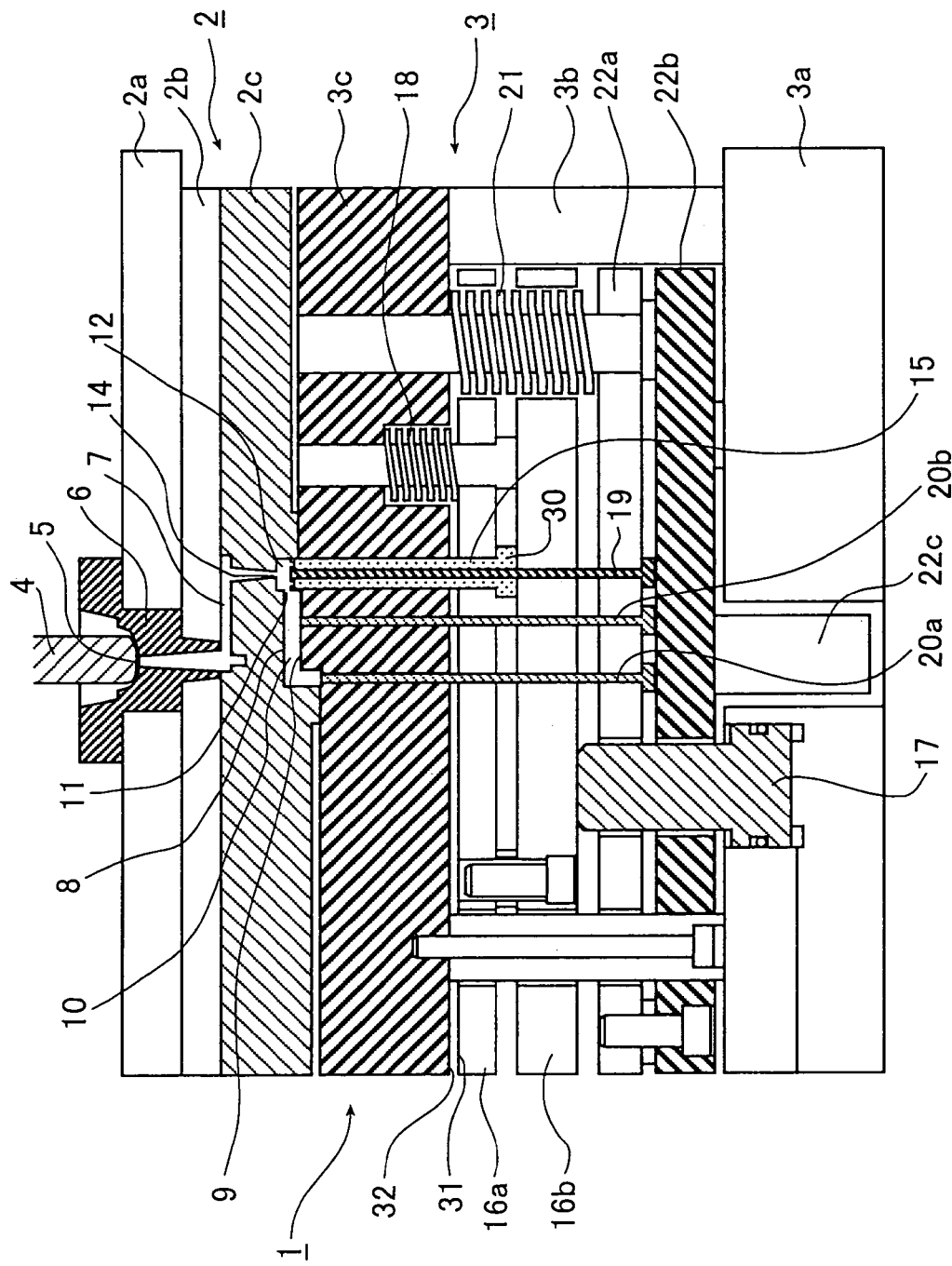
FIG. 1 is a cutaway view of cold runner type injection mold used in the first embodiment.

An injection molding method of the present invention (hereinafter referred to as the "method of the present invention") and an injection mold of the present invention will be described below in details.

In the method of the present invention, a molten resin material injected by an injection molding machine is charged into a cavity defined by a fixed die and a movable die from a gate provided in the fixed die via a runner provided in the fixed die. At this time, the molten resin material introduced from the gate is charged into the cavity while flowing into a resin reservoir that is formed on the side of the gate in the fixed die. When the molten resin material is introduced into the cavity via the resin reservoir, a communicating portion that allows the molten resin material to pass through a space between the resin reservoir and the cavity is formed. A cut punch is provided on the side of the movable die that confronts the gate through the resin reservoir and is movable so that the cut punch is inserted into the resin reservoir so as to be in slidable contact with the resin reservoir in order to form the communicating portion, and the distal end of such cut punch is arranged on the side of the movable die. As shown in, e.g., FIG. 2 to be referred to later, when a molten resin material is charged into a cavity 10 via a resin reservoir 12 with a cut punch 15 not yet in operation, a distal end 23 of the cut punch 15 is held on the side of the movable die in such a position as to open a communicating portion 11 through which the resin passes from the resin reservoir 12 to the cavity 10. Then, as shown in, e.g., FIG. 4 to be referred to later, after the molten resin material has been charged into the cavity and the resin reservoir, the resin material gradually solidifies from a portion that is in direct contact with the cooled dies toward the inner portion. At this time, when the resin material that is still molten is present in the resin reservoir, the cut punch is operated so that the punch moves toward the gate in such a manner as to be inserted into the resin reservoir. Then, as shown in, e.g., FIG. 5, the cut punch closes the communicating portion while forcibly pushing the still molten resin material present in the resin reservoir back into the gate. At the same time, the cut punch cuts the resin material at the communicating portion, so that a resin molded product formed in the cavity is separated from a resin solidified portion formed in the resin reservoir.

Figure 2:
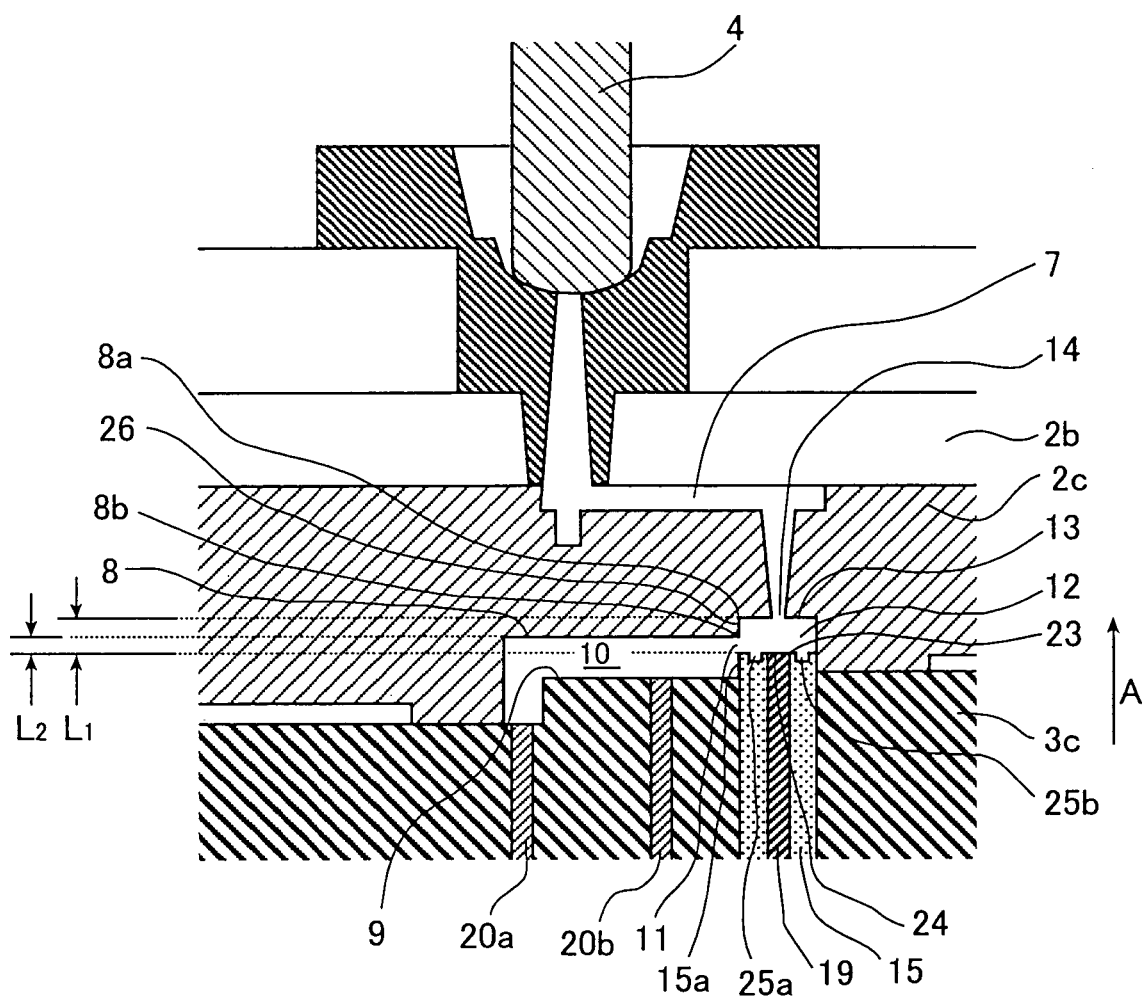
FIG. 2 is a cutaway sectional view of main portion in the cold runner type injection mold used in the first embodiment.

In an injection mold used in the method of the present invention, the depth as viewed in a moving direction of the cut punch in the resin reservoir (i.e., a distance between the distal end of the cut punch that is not yet in operation and held on the side of the movable die and a surface on the side of the gate of the fixed die forming the resin reservoir), e.g., a distance $L_1$ shown in FIG. 2 and an opening distance of the communicating portion in the moving direction of the cut punch, e.g., a distance $L_2$ shown in FIG. 2 are arranged so that $L_1 > L_2$. As a result of such arrangement, the solidifying speed of the resin material in the resin reservoir becomes completely lower than that of the resin material in the communicating portion. Hence, even if the resin material in the communicating portion has solidified almost completely or half-solidified, the resin material that is still molten is present in the resin reservoir. If the cut punch is operated to move toward the fixed die under such condition, the still molten resin material is forcibly pushed back into the runner via the gate, and this gives the cut punch a moving stroke. Therefore, the larger the thickness of the resin reservoir is when compared with the opening distance of the communicating portion, the larger the difference between the solidifying time of the resin material in the resin reservoir and that of the resin material in the communicating portion becomes. As a result, such arrangement is advantageous in increasing the range of timings at which the cut punch is stably operated. On the other hand, the resin reservoir is scrapped every time the molding process ends, and thus it is not economically desirable to make it thicker than necessary. Thus, as a range in which the molding process can be performed stably and economically and in which burring and whitening do not occur at such a part of a resin molded product as to correspond to the communicating portion, the depth as viewed in the moving direction of the cut punch in the resin reservoir is preferably set from 1.5 to 10 times the opening distance of the communicating portion, or more preferably from 2 to 6 times.

Figure 14A:
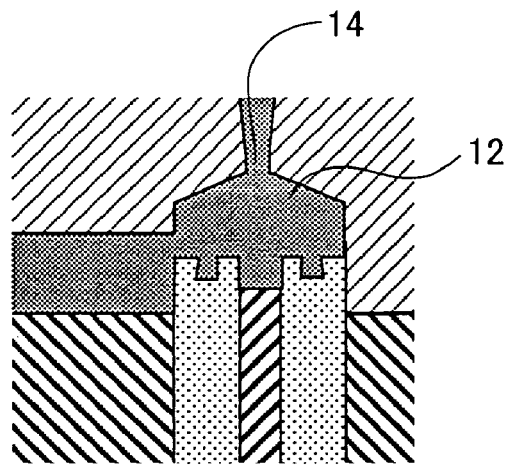
FIG. 14a, FIG. 14b and FIG. 14c respectively show prefered emobodeiment of a sectional form of the resin reservoir in the injection mold of the present invention.
Figure 14B:
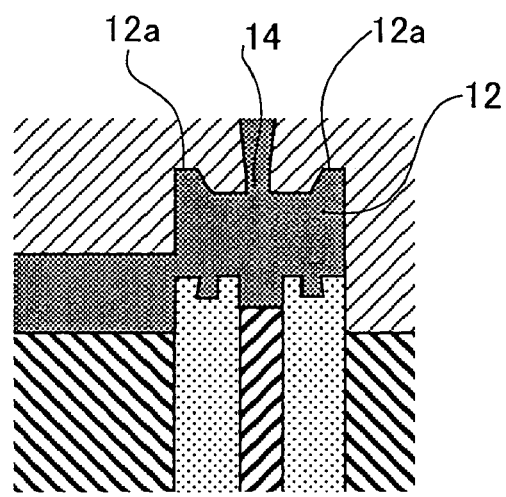
Figure 14C:
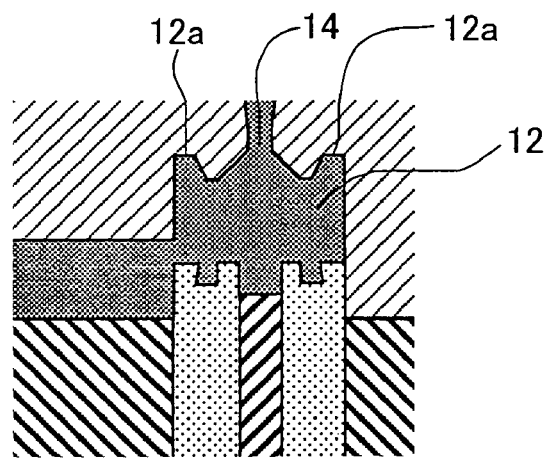

Further, in the injection mold used in the method of the present invention, as shown in FIG. 14a, such a cross section of the resin reservoir that the depth as viewed in the moving direction of the cut punch 15 in the resin reservoir 12 is gradually increased toward the gate 14 is advantageous in increasing the operating area of the cut punch. Further, as shown in FIG. 14b, such a cross section that the depth of the outermost peripheral portions 12a at both ends of the resin reservoir 12 is increased is also advantageous in ensuring the operating stroke of the cut punch. Still further, as shown in FIG. 14c, such a cross section that the depth as viewed in the moving direction of the cut punch 15 in the resin reservoir 12 is gradually increased toward the gate 14 and the depth of the outermost peripheral portions 12a at both ends of the resin reservoir 12 is increased may also be acceptable and is advantageous in ensuring the operating stroke of the cut punch.

Still further, it is so arranged that the diameter of the shaft of a pusher pin for pushing the resin solidified portion in the resin reservoir is increased so that the area of projection of the distal end of the moving cut punch as viewed in the moving direction of the cut punch is decreased, and that the cut punch is operated independently of the pusher pin so that when the cut punch operates, the pusher pin does not operate. Such an arrangement is advantageous in ensuring the operating area and stroke of the cut punch.

In the method of the present invention, when the resin material in the communicating portion between the resin reservoir and the cavity semi-solidifies and the resin material that is still molten is present in the resin reservoir after the charging of the molten resin material into the cavity has been completed, the cut punch is operated to move toward the gate of the fixed die, so that the cut punch closes the communicating portion. The operating timing of the cut punch is selected appropriately in accordance with the shape of the molding cavity, i.e., the shape of a resin molded product, the solidifying speed of the resin material, the shape of the resin reservoir, and the like. Generally, if the cut punch is operated when the resin material in the communicating portion is still molten, i.e., if the cut punch is operated at an early timing, the resin material creeps into an operating clearance provided between a side surface of the resin reservoir and a side surface of the cut punch since the mold is designed to have a slight clearance from manufacturing and structural considerations. As a result, there is a danger that burrs are formed at the cut end of the resin molded product.

Further, if the clearance is decreased to overcome the burring problem, the side surface of the resin reservoir abuts against the cut punch to cause scorings, and in the extreme case, there may be an operation problem, e.g., that the communicating portion of the fixed die is damaged. In addition, if the cut punch is operated after the resin material in the communicating portion has completely solidified, i.e., if the cut punch is operated at a later timing, tiny cracks are present at the cut end of a resin molded product obtained and whitening appears over the exterior of the product. Therefore, it is important to determine while confirming the operating timing of the cut punch for the method of the present invention through tests and the like so that the timing comes later than when the cut end burrs and earlier than when the cut end whitens in the resin molded products obtained.

In the method of the present invention, the larger the diameter of the opening of the gate through which the molten resin material passes when the resin material that is still molten in the resin reservoir is pushed back into the runner by the operation of the cut punch, the easier the molten resin material is caused to flow back into the runner, and thus the larger diameter of the opening of the gate is advantageous in operating the cut punch as desired. On the other hand, in the case where a cold runner type injection mold is used, a larger diameter of the opening of the gate is likely to make it hard to separate the resin solidified portion formed in the resin reservoir from the runner. To overcome this problem, in the case where a cold runner type injection mold is used, it is preferred to previously fabricate the mold having an ordinary pin gate diameter, examine the operating conditions of the cut punch by checking the burring or whitening conditions of an obtained molded product, and determine an appropriate opening diameter by increasing the diameter as necessary. This applies similarly to the diameter of the opening of the gate of the injection mold of the hot runner structure. In the case where a hot runner type injection mold having a valve gate is used, there is no need to consider the problem of separating the resin solidified portion in the resin reservoir from the runner at the gate since the gate is mechanically closed by a needle pin. Therefore, it is preferred to increase the diameter of the opening of the gate as much as possible. For example, the diameter of the opening of the gate preferably ranges from 1.0 to 2.5 mm.

EMBODIMENTS OF THE INVENTION

An injection molding method and an injection mold, which are preferred embodiments 1 and 2 of the present invention will now be described based on FIGS. 1 to 13. FIGS. 1 to 7 show a first embodiment for fabricating a bent plate-like resin molded product using a cold runner type mold that is a preferred embodiment of a mold of the present invention. FIGS. 8 to 13 show a second embodiment for fabricating a thin annular part using a hot runner type mold.

Cold runner type injection mold 1 used in the first embodiment whose main portion is shown in FIG. 1 in the form of a cutaway section includes a fixed die 2 and a movable die 3. The fixed die 2 includes a fixed mounting plate 2a and a fixed die plate 2c mounted on the fixed mounting plate 2a through a fixed back plate 2b. A sprue bush 6 in which an introducing hole 5 is formed is provided on the fixed mounting plate 2a. The introducing hole 5 introduces a molten resin material injected from an injection nozzle 4 of an injection molding machine into the mold. The introducing hole 5 of the sprue bush 6 is formed inside the fixed back plate 2b and the fixed die plate 2c, and communicates with a runner 7 through which the molten resin material flows.

The movable die 3 has a movable mounting plate 3a and a movable die plate 3c that is mounted on the movable mounting plate 3a through a spacer block 3b.

Figure 3:
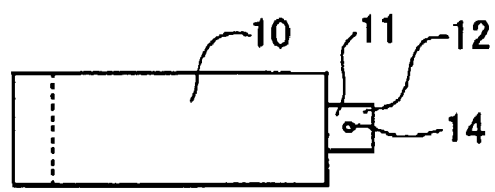
FIG. 3 is a illustrative view of cavity and resin reservoir in the cold runner type injection mold used in the first embodiment.

A resin reservoir 12 is formed by recessing the fixed die plate 2c of the fixed die. That is, at the time the fixed die 2 and the movable die 3 of the injection mold 1 are matched, a stepped molding surface 8 formed on the fixed die plate 2c of the fixed die 2 and a stepped molding surface 9 formed on the movable die plate 3c of the movable die 3 so as to correspond to the molding surface 8 forms the resin reservoir 12 that communicates to a cavity 10 that forms the resin molded products through the communicating portion 11 as shown by a plan view of FIG. 3. In FIG. 3, reference numeral 14 denotes a gate for introducing the molten resin material into the cavity.

Further, as shown in FIG. 2, the resin reservoir 12 is connected to the runner 7 via the gate 14 formed in a resin reservoir surface 13 on the molding surface 8 of the fixed die plate 2c of the fixed die. The runner 7 introduces the molten resin material from the nozzle 4 of the injection molding machine.

Further, a cut punch 15 is provided on the side of the movable die plate 3c of the movable die 3 that confronts the gate 14 through the resin reservoir 12. The cut punch 15 is so arranged that when the molten resin material is being charged into the cavity, a distal end 23 of the cut punch is located between the resin reservoir 12 and the cavity 10 at such a position as to open a communicating portion 11 that allows the resin reservoir 12 and the cavity 10 to communicate with each other so that the molten resin material is introduced into the cavity via the resin reservoir 12, and that when the resin material that is still molten is present in the resin reservoir 12 after the molten resin material has been charged into the cavity, the cut punch is moved from the movable die 3 to the fixed die 2 so that the resin reservoir 12 is separated from the cavity 10 at the communicating portion 11. The cut punch 15 is secured to a cut punch driving hydraulic cylinder 17 together with cut punch pusher plates 16a and 16b, and is urged by a spring 18 in a direction opposite to a driving direction.

Further, a resin reservoir pusher pin 19 for pushing out a resin solidified portion formed in the resin reservoir 12 is inserted into the cut punch 15 so as to be slidable independently of the cut punch 15. Also, molded product pusher pins 20a and 20b for pushing out a resin molded product formed in the cavity 10 are slidably inserted into the movable die plate 3c. The resin reservoir pusher pin 19 and the molded product pusher pins 20a and 20b pass through the cut punch pusher plates 16a and 16b and are mounted on pusher plates 22a and 22b that are urged by a spring 21 in a direction opposite to a driving direction of the pusher pins. The resin reservoir pusher pin 19 and the molded product pusher pins 20a and 20b are driven forward (in the elevating direction as viewed in FIG. 1) when a pushing rod (not shown) of the molding machine pushes first a pusher rod receiver 22c and then the pusher plate 22b that is integrally mounted on the pusher rod receiver 22c.

As shown in FIGS. 1 and 2, undercut portions 25a and 25b are formed in the distal end 23 of the cut punch 15. The portions 25a and 25b allow the cut punch to hold the resin solidified portion formed in the resin reservoir 12 so that the resin solidified portion does not remain on the side of the fixed die at the time of mold opening.

In the injection mold 1, the communicating portion 11 provided between the resin reservoir 12 and the cavity is arranged so that the depth as viewed in the moving direction of the cut punch 15 in the resin reservoir becomes larger than the opening distance of the communicating portion in the moving direction of the cut punch as shown in FIG. 2. That is, a distance $L_1$ between a molding surface 8a of the fixed die plate 2c on a side surface 26 of the resin reservoir 12 and the distal end 23 of the cut punch 15 is arranged to be larger than the opening distance of the communicating portion 11 extending in the moving direction of the cut punch, i.e., a distance $L_2$ between a molding surface 8b of the fixed die plate 2c and the distal end 23 of the cut punch 15 ($L_1 > L_2$). As a result of such arrangement, when the cut punch 15 is driven in a direction indicated by an arrow A, not only a side surface 15a of the cut punch 15 closes the communicating portion 11, but also cuts the resin molded product formed in the cavity 10 away from the resin solidified portion formed in the resin reservoir 12 at the communicating portion 11.

In the injection molding method using the injection mold 1 that has the cold runner structure shown in FIG. 1, first, the movable die 3 is driven to close the fixed die 2 and the movable die 3, which in turn forms the cavity 10 and the resin reservoir 12 communicating with the cavity 10. Then, the molten resin material is injected from the injection nozzle 4 of the injection molding machine, the nozzle 4 being brought into contact with the introducing hole 5 that is formed in the sprue bush 6 provided in the fixed mounting plate 2a. The injected molten resin material is introduced into the resin reservoir 12 from the gate 14 while flowing through the runner 7, and is further charged into the cavity 10 via the communicating portion 11. At this time, the cut punch 15 does not operate and is held on the side of the movable die 3.

Figure 4:
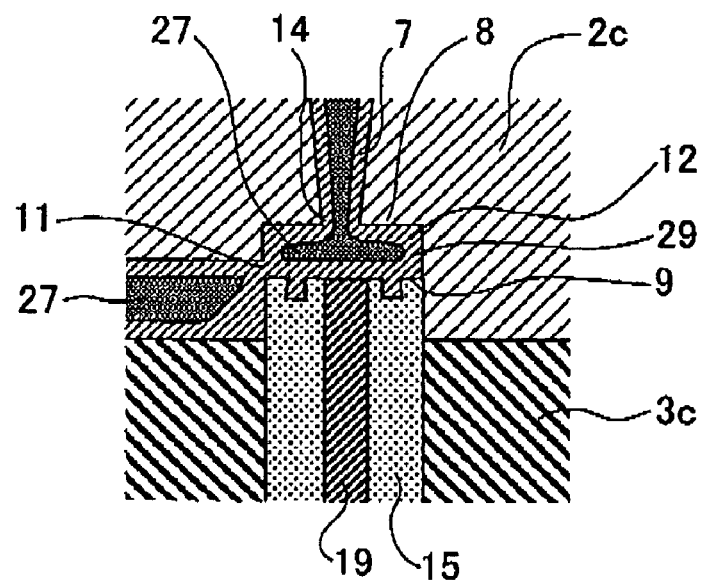
FIGS. 4 to 7 respectively show a process of the first embodiment.

The resin material charged into the resin reservoir 12, the communicating portion 11 and the cavity 10 is cooled by cooling water circulating through cooling means, e.g., cooling water passages appropriately provided within the fixed die 2 and the movable die 3, and thus solidified. After the charging of the resin material has been completed, the charged resin material is cooled to solidify, as shown in FIG. 4, from the outside portion that is in contact with the molding surface 8 of the fixed die plate 2c and the molding surface 9 of the movable die plate 3c, and the resin material at the communicating portion 11 where the molding surface 8 neighbors the molding surface 9 solidifies or semi-solidifies first. On the other hand, in the resin reservoir 12 that is thicker than the communicating portion 11, i.e., in the resin reservoir 12 in which the distance between the molding surface 8 of the fixed die plate 2c and the molding surface 9 of the movable die plate 3c is large, the outside portion of the resin material that is in contact with the molding surfaces 8 and 9 solidifies or semi-solidifies, but a resin material portion 27 that is still molten is present in the inside.

Figure 5:
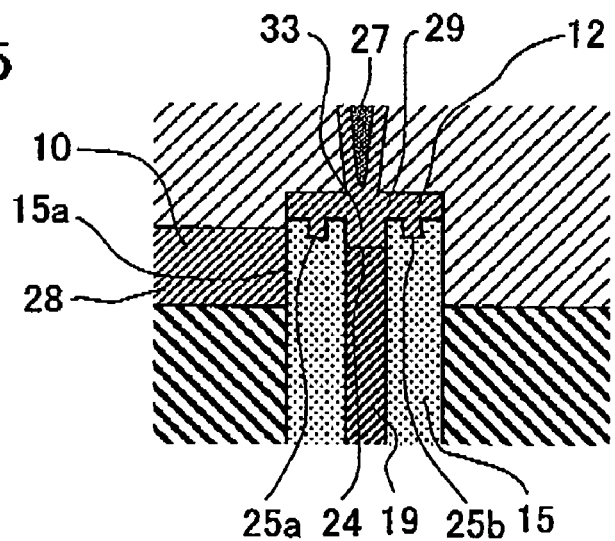

At this time, the cut punch 15 that is mounted on the cut punch pusher plates 16a and 16b is operated by the cut punch driving hydraulic cylinder 17 against the urging force of the spring 18, so that the cut punch moves from the movable die 3 to the fixed die 2. The still molten resin material 27 in the resin reservoir is pushed back from the gate 14 to the runner 7 by the pushing force of the moving cut punch 15. As a result, the volume of the resin in the resin reservoir is reduced, which in turn provides a stroke for allowing the cut punch 15 to move. Hence, as shown in FIG. 5, the cut punch 15 advances toward the fixed die plate 2c, so that the side surface 15a of the cut punch 15 closes the communicating portion 11 and a resin molded product 28 in the cavity 10 is cut away from a resin solidified portion 29 formed in the resin reservoir 12 at the communicating portion 11. At this time, the cut punch 15 is mounted with its base 30 held between the cut punch pusher plates 16a and 16b shown in FIG. 1, so that the moving distance of the cut punch 15 is regulated by the distance between an outside surface 31 of the cut punch pusher plate 16a and a rear surface 32 of the movable die plate 3c. The resin reservoir pusher pin 19 inserted into the cut punch 15 so as to be slidable independently of the cut punch 15 does not move together with the cut punch 15 when the cut punch moves, and thus a top face 24 of the pin 19 forms a recess 33.

Figure 6:
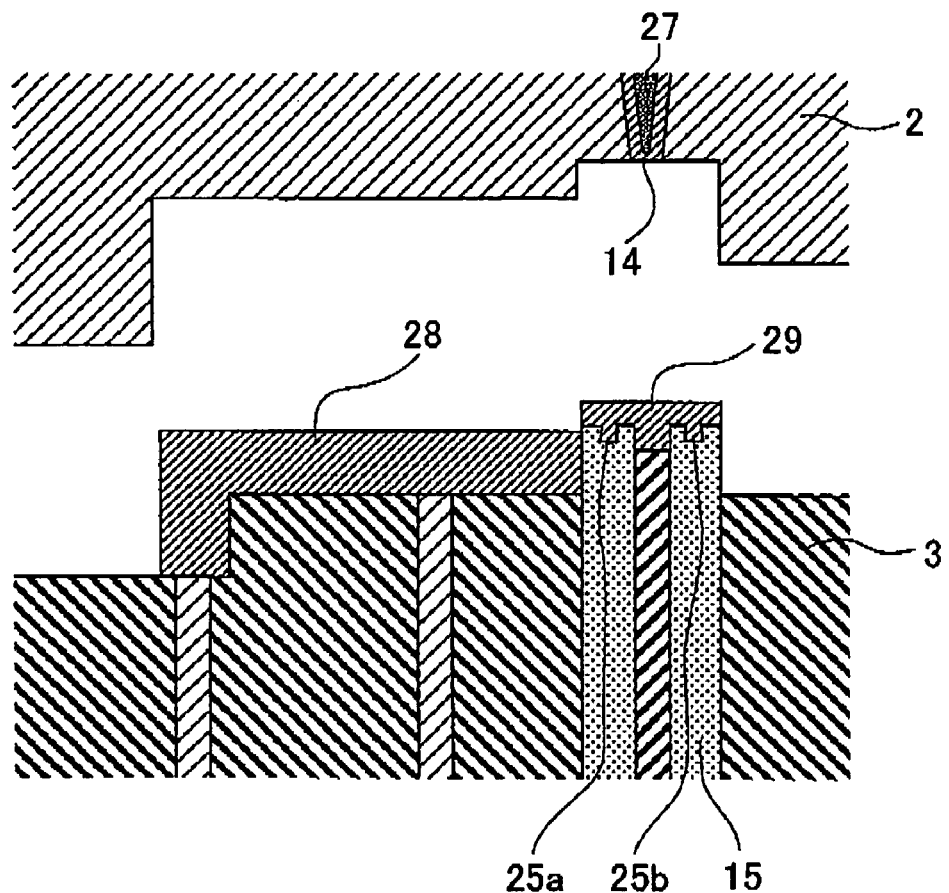

The resin material in the cavity 10 and the resin reservoir 12 is cooled and solidifies, so that the resin molded product 28 is formed in the cavity 10, and the resin solidified portion 29 including a resin material portion solidified at the recess 33 and the undercut portions 25a and 25b is formed in the resin reservoir 12. Then, as shown in FIG. 6, the movable die 3 is driven to open the injection mold 1. At this time, the resin solidified portion 29 formed in the resin reservoir is separated from the resin molded product, and held on the distal end of the cut punch 15. Further, the solidified portion formed in the undercut portions 25a and 25b functions as a holding portion for holding the resin solidified portion 29 on the distal end of the cut punch 15.

Figure 7:
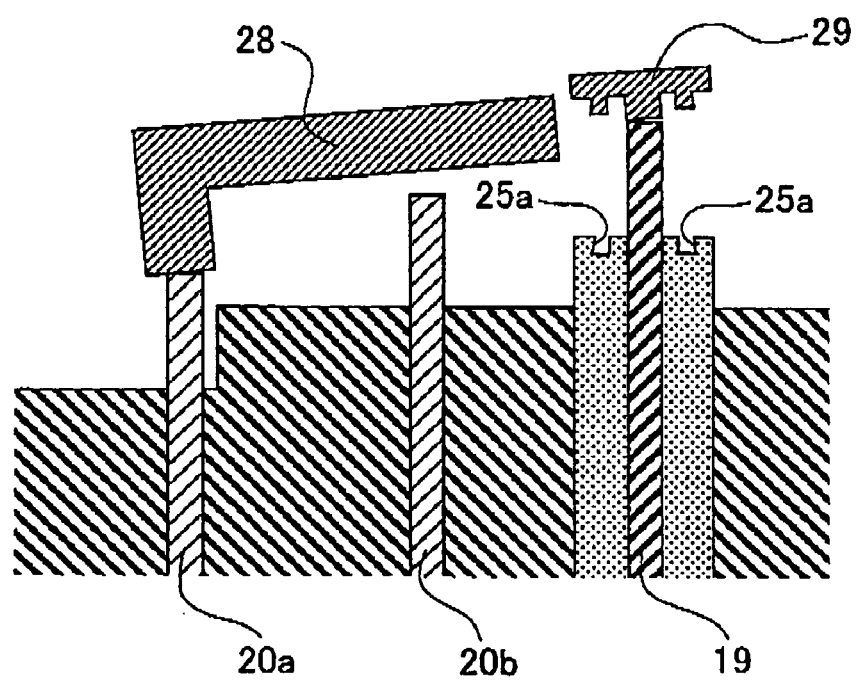

Next, as shown in FIG. 7, the pusher rod (not shown) of the molding machine drives the resin reservoir pusher pin 19 and the molded product pusher pins 20a and 20b mounted on the pusher plates 22a and 22b against the urging force of the spring 21, and the resin molded product 28 and the resin solidified portion 29 are pushed out independently of each other and obtained in the form of cut pieces.

Figure 8:
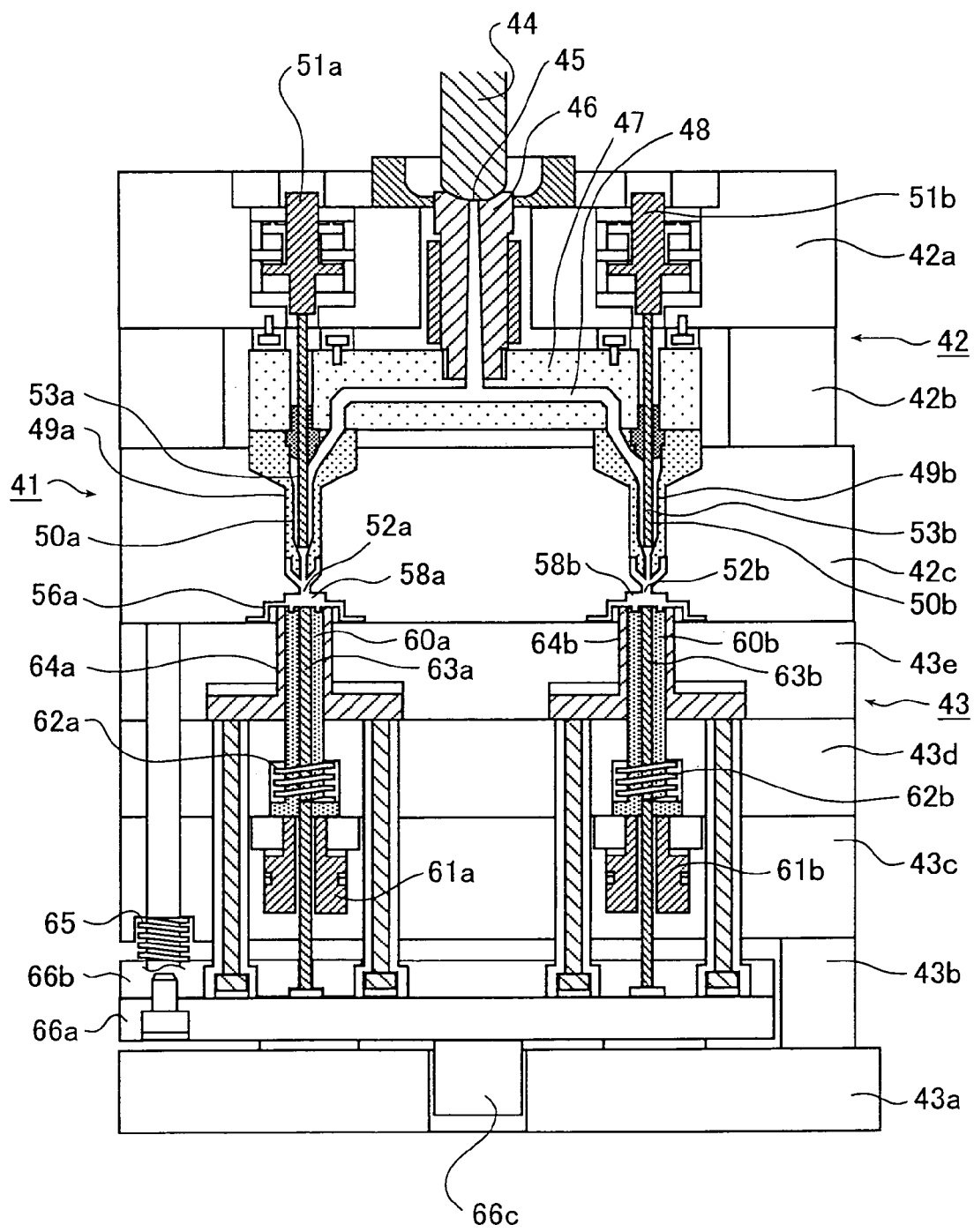
FIG. 8 is a illustrative view of hot runner type injection mold used in the second embodiment.

Further, FIGS. 8 to 13 show the second embodiment for fabricating thin annular parts using a hot runner type four-cavity mold based on a valve gate system. FIG. 8 shows only a half of the four-cavity injection mold, omitting the other half. The following description is based on the half of the mold with two cavities shown in FIG. 8, and a description of the other half is omitted.

A hot runner type injection mold 41 used in the second embodiment whose main portion is shown in FIG. 8 in a cutaway form includes a fixed die 42 and a movable die 43. The fixed die 42 has a fixed mounting plate 42a and a fixed die plate 42c mounted on the fixed mounting plate 42a through a spacer block 42b. A sprue bush 46 in which an introducing hole 45 is formed is provided on the fixed mounting plate 42a. The introducing hole 45 introduces a molten resin material injected from an injection nozzle 44 of an injection molding machine into the mold. The introducing hole 45 of the sprue bush 46 is connected to a runner 48 that is provided in a manifold block 47 interposed between the fixed mounting plate 42a and the fixed die plate 42c, and communicates with hot runners 50a and 50b of hot runner nozzles 49a and 49b provided in the fixed die plate 42c. Needle pins 53a and 53b are inserted into the hot runners 50a and 50b of the hot runner nozzles 49a and 49b, respectively. The pins 53a and 53b are driven by needle pin driving cylinders 51a and 51b provided in the fixed mounting plate 42a and control the introduction of the molten resin material into resin reservoirs 58a and 58b, and cavities 56a and 56b which will be described later.

The movable die 43 includes a movable mounting plate 43a and a movable die plate 43e secured to movable back plates 43c and 43d that are mounted on the movable mounting plate 43a through a spacer block 43b.

Figure 9:
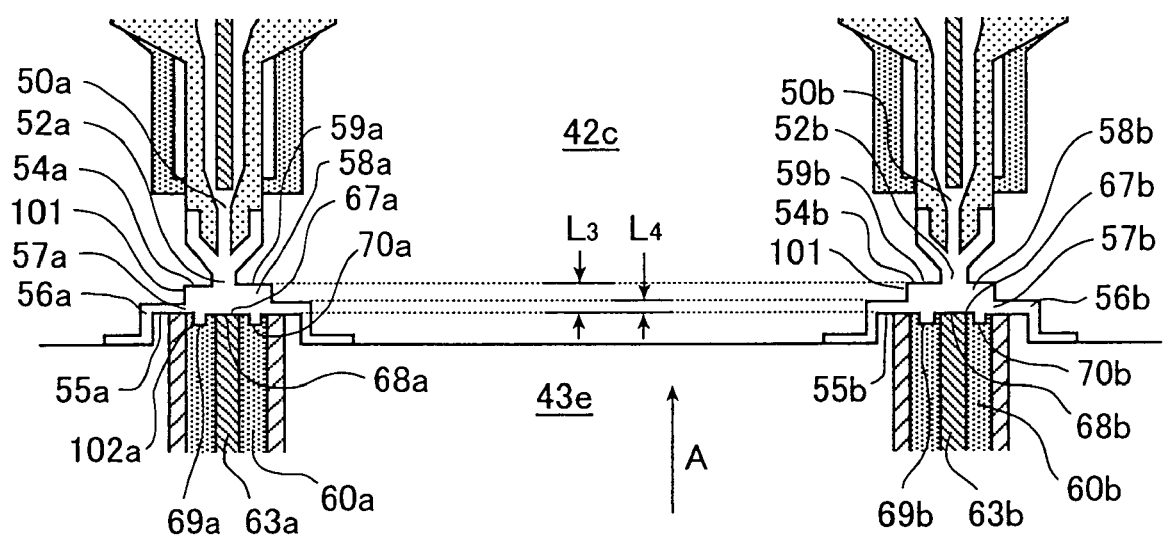
FIG. 9 is a cutaway sectional view of main portion in the hot runner type injection mold used in the second embodiment.

The resin reservoirs 58a and 58b are formed by molding surfaces 54a and 54b and molding surfaces 55a and 55b, respectively. That is, as shown in FIGS. 8 and 9, when the fixed die 42 and the movable die 43 of the injection mold 41 are closed, the stepped molding surfaces 54a and 54b formed on the fixed die plate 42c of the fixed die 42 and the stepped molding surfaces 55a and 55b formed on the movable die plate 43e of the movable die 43 so as to correspond to the molding surfaces 54a and 54b form the resin reservoirs 58a and 58b that communicate with annular cavities 56a and 56b for forming resin molded products through communicating portions 57a and 57b. Further, gates 52a and 52b are formed in resin reservoir surfaces 59a and 59b of the molding surfaces 54a and 54b of the resin reservoirs 58a and 58b on the side of the fixed die plate 42c, respectively.

The resin reservoirs 58a and 58b are connected to the hot runners 50a and 50b via the gates 52a and 52b formed in the resin reservoir surfaces 59a and 59b of the molding surfaces 54a and 54b on the fixed die plate 42c of the fixed die 42. The hot runners introduce the molten resin material.

Cut punches 60a and 60b are provided on the side of the movable die plate 43e of the movable die 43 that confronts the gates 52a and 52b through the resin reservoirs 58a and 58b. The cut punches 60a and 60b are so arranged that when the molten resin material is being charged into the cavities, distal ends 67a and 67b of the punches are located between the resin reservoirs and cavities at such positions as to open the communicating portions that allow the resin reservoirs 58a and 58b and the cavities 56a and 56b to communicate with each other so that the molten resin material is introduced into the cavities via the resin reservoirs 58a and 58b, and that when the resin material that is still molten is present in the resin reservoirs 58a and 58b=after the molten resin material has been charged into the cavities, the cut punches are moved from the movable die 43 to the fixed die 42 so that the resin reservoirs 58a and 58b are separated from the cavities 56a and 56b at the communicating portions 57a and 57b. The cut punches 60a and 60b are connected to cut punch driving hydraulic cylinders 61a and 61b provided in the movable back plate 43c together with the movable back plates 43c and 43d, and are urged by springs 62a and 62b in a direction opposite to a driving direction.

Further, resin reservoir pusher pins 63a and 63b for pushing out resin solidified portions formed in the resin reservoirs 58a and 58b are inserted into the cut punches 60a and 60b so as to be slidable independently of the cut punches 60a and 60b. Also, molded product pusher sleeves 64a and 64b for pushing out resin molded products formed in the cavities 56a and 56b are slidably inserted into the movable die plate 43e.

The resin reservoir pusher pins 63a and 63b and the molded product pusher sleeves 64a and 64b pass through the movable back plates 43c and 43d and are mounted on pusher plates 66a and 66b urged by a spring 65 in a direction opposite to a moving direction of the pusher pins and sleeves.

The resin reservoir pusher pins 63a and 63b and the molded product pusher sleeves 64a and 64b are driven forward (in the elevating direction as viewed in FIG. 8) when a pushing rod (not shown) of the molding machine pushes first a pusher rod receiver 66c and then the pusher plates 66a and 66b that are integrally mounted on the pusher rod receiver 66c.

As shown in FIGS. 8 and 9, undercut portions 69a and 69b are formed in the distal ends 67a and 67b of the cut punches 60a and 60b. The portions 69a and 69b allow the cut punches 60a and 60b to hold the resin solidified portions formed in the resin reservoirs 58a and 58b so that the resin solidified portions do not remain on the side of the fixed die at the time of mold opening.

Further, in the injection mold 41, the communicating portion 57a provided between the resin reservoir 58a and the cavity 56a and the communicating portion 57b provided between the resin reservoir 58b and the cavity 56b are arranged so that the depth of the resin reservoirs become larger than the opening distance of the communicating portions in the moving direction of the cut punches 60a and 60b. That is, when the cut punches 60a and 60b are not operated and held on the side of the movable die plate 43e, a distance $L_3$ between the molding surface 54a or 54b of the fixed die plate 42c on a side surface 101 of the resin reservoir 58a or 58b and the distal end 67a or 67b of the cut punch 60a or 60b is arranged to be larger than the opening distance of the communicating portion 57a or 57b extending in the moving direction of the cut punch, i.e., a distance $L_4$ between the molding surface 54a or 54b of the fixed die plate 43e and the distal end 67a or 67b of the cut punch 60a or 60b ($L_3 > L_4$). As a result of such arrangement, the cut punch 60a is operated to move in a direction indicated by an arrow A, so that a side surface 102a of the cut punch 60a not only closes the communicating portion 57a, but also cuts the resin molded product formed in the cavity 56a away from the resin solidified portion formed in the resin reservoir 58a at the communicating portion 57a. Further, a similar operation is performed at the resin reservoir 58b and the cavity 56b.

In the injection molding method using the injection mold 41 that has the hot runner structure shown in FIG. 8, first, the movable die 43 is driven to close the fixed die 42 and the movable die 43, which in turn forms the cavities 56a and 56b and the resin reservoirs 58a and 58b that communicate with the cavities 56a and 56b through the communicating portions 57a and 57b. Then, the injection nozzle 44 of the injection molding machine is brought into contact with the introducing hole 45 formed in the sprue bush 46 provided in the fixed mounting plate 42a, and the molten resin material is injected. The injected molten resin material is introduced into the hot runners 50a and 50b while flowing through the runner 48. At this time, the needle pins 53a and 53b are driven upward as viewed in the drawing by the needle driving cylinders 51a and 51b to open the gates 52a and 52b, so that the molten resin material is introduced and charged into the cavities 56a and 56b via the resin reservoirs 58a and 58b and the communicating portions 57a and 57b. At this time, the cut punches 60a and 60b are not operated and held on the side of the movable die 43.

The resin material charged into the resin reservoirs 58a and 58b, the communicating portions 57a and 57b and the cavities 56a and 56b is cooled by cooling water flowing through cooling means, e.g., cooling water passages appropriately provided within the fixed die 42 and the movable die 43, and thus solidified.

Next, an operation at the resin reservoir 58a, the communicating portion 57a and the cavity 56a will be described as an example. An operation at the resin reservoir 58b, the communicating portion 57b and the cavity 56b is also similar.

Figure 10:
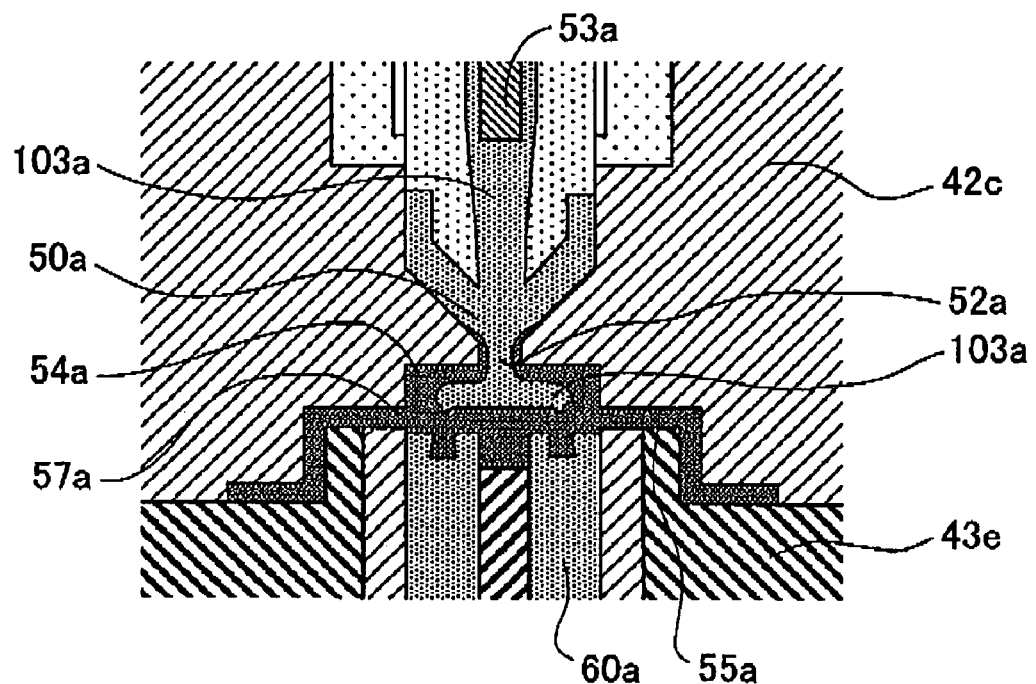
FIGS. 10 to 13 respectively show a process of the second embodiment.

After the charging of the molten resin material has been completed, the charged resin material is cooled and solidifies, as shown in FIG. 10, from the outside portion that is in contact with the molding surface 54a of the fixed die plate 42c and the molding surface 55a of the movable die plate 43e, and the resin material at the communicating portion 57a where the molding surface 54a neighbors the molding surface 55a solidifies or semi-solidifies first. On the other hand, in the resin reservoir 58a that is deeper than the communicating portion 57a, i.e., in the resin reservoir in which the distance between the molding surface 54a of the fixed die plate 42c and the molding surface 55a of the movable die plate 43e is larger than the communicating portion 57a, the outside portion of the resin material that is in contact with the molding surfaces 54a and 55a solidifies or semi-solidifies, but a resin material portion 103a that is still molten is present in the inside.

Figure 11:
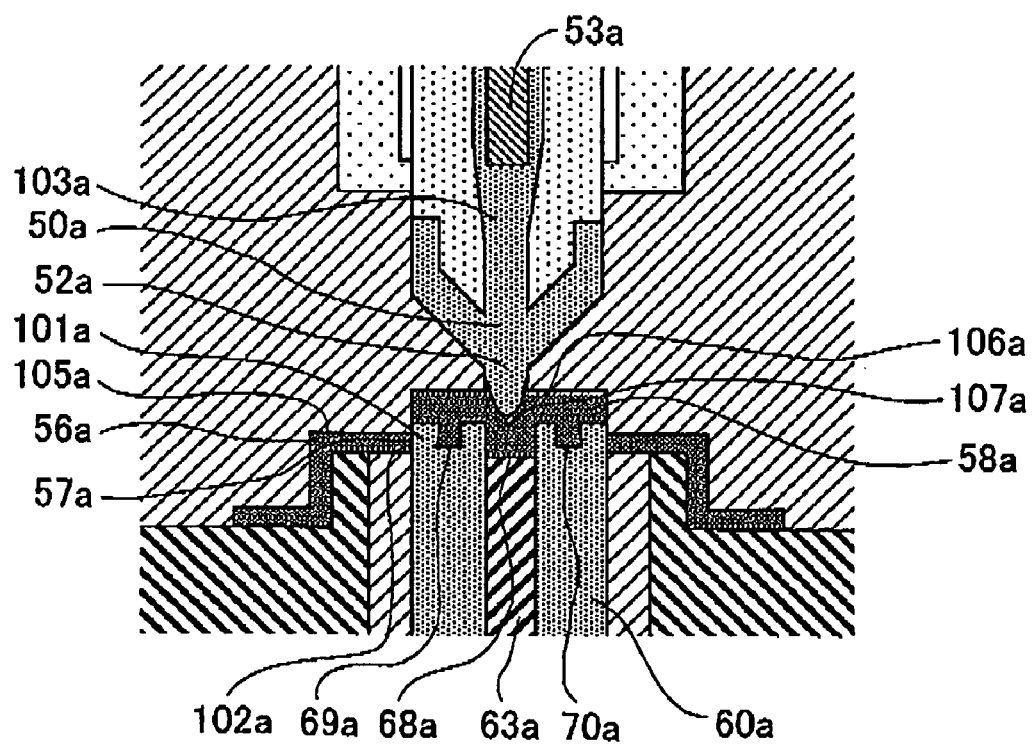

At this time, the cut punch 60a mounted on the movable back plates 43c and 43d is moved from the movable die 43 to the fixed die 42 by the cut punch driving hydraulic cylinder 61a against the urging force of the spring 62a. The still molten resin material portion 103a in the resin reservoir is pushed back into the hot runner 50a from the gate 52a by the pushing force of the driven cut punch 60a. As a result, the volume of the resin in the resin reservoir is reduced, which in turn provides a stroke for allowing the cut punch 60a to move. Hence, as shown in FIG. 11, the cut punch 60a moves toward the fixed die plate 42c, so that the side surface 102a of the cut punch 60a not only closes the communicating portion 57a, but also cuts a resin molded product 105a in the cavity 56a away from a resin solidified portion 106a formed in the resin reservoir 58a at the communicating portion 57a. At this time, the resin reservoir pusher pin 63a that is inserted into the cut punch 60a so as to be slidable independently of the cut punch 60a is not driven together with the cut punch 60a when the cut punch 60a is driven, and thus a top face 68a of the pin 63a forms a recess 107a.

Figure 12:
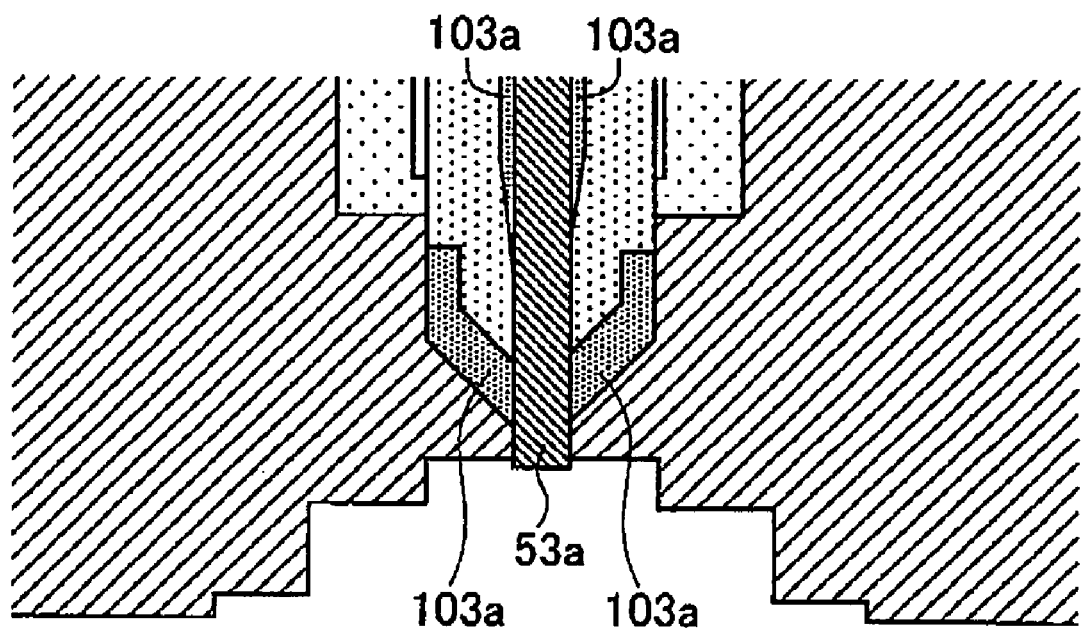
Figure 12:
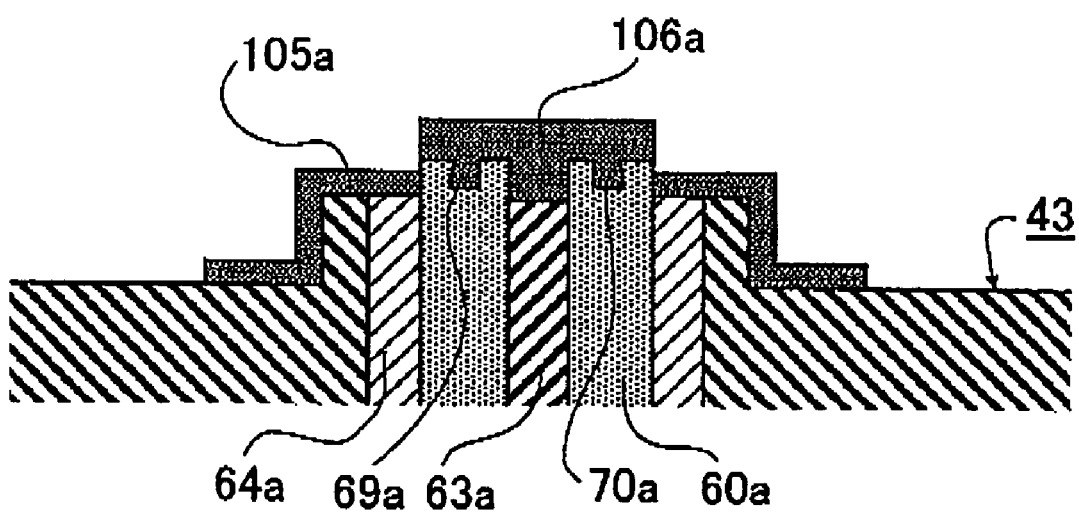

Then, the needle pin 53a is driven to close the gate 52a, and the resin material in the cavity 56a and the resin reservoir 58a is cooled and solidifies. Then, the resin molded product 105a is formed in the cavity 56a, and the resin solidified portion 106a including a resin material portion solidified at the recess 107a and the undercut portions 69a and 70a is formed in the resin reservoir 58a. As shown in FIG. 12, the movable die 43 is thereafter driven to open the injection mold. At this time, the resin solidified portion 106a formed in the resin reservoir is separated from the resin molded product 105a, and held on the distal end of the cut punch 60a. Further, the solidified portion formed in the undercut portions 69a and 70a functions as a holding portion for holding the resin solidified portion 106a on the distal end of the cut punch 60a.

Figure 13:
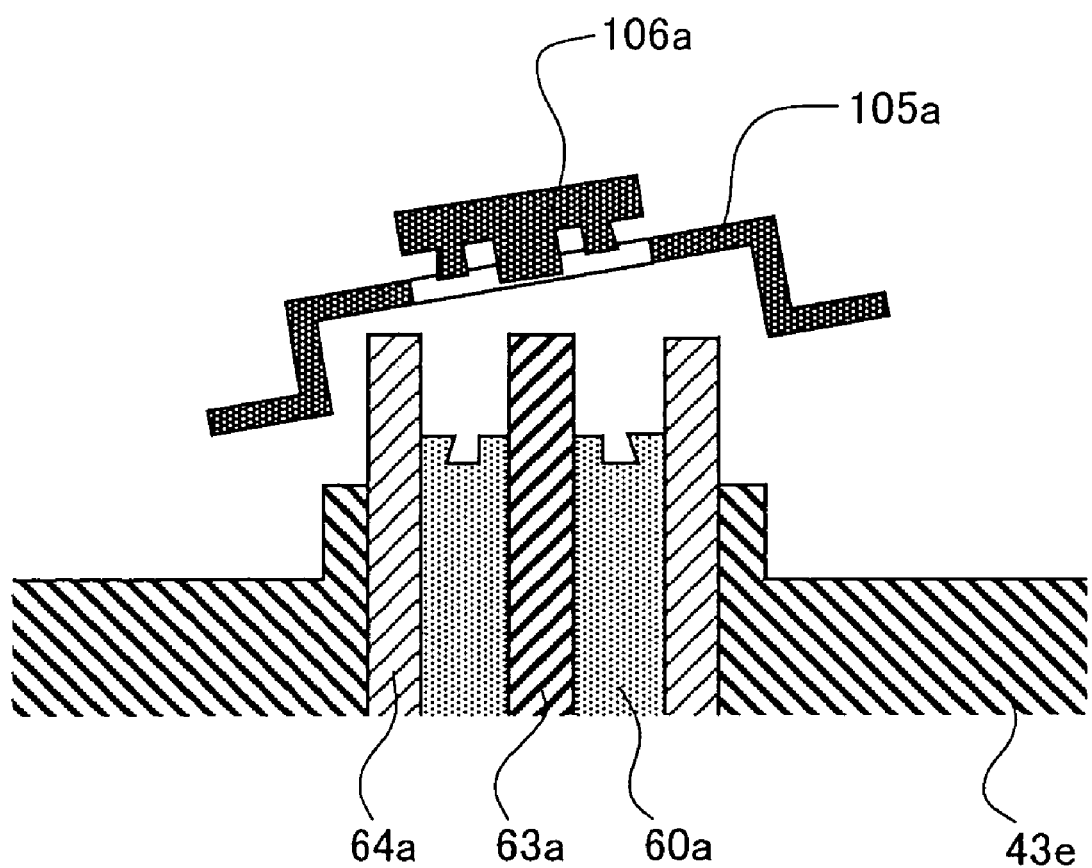

Then, as shown in FIG. 13, the pusher rod (not shown) of the molding machine drives the resin reservoir pusher pin 63a and the molded product pusher sleeve 64a mounted on the pusher plates 66a and 66b against the urging force of the spring 62a, so that the thin annular resin molded product 105a and the disk-like resin solidified portion 106a are pushed out independently of each other in cut pieces.

EXAMPLES

Test Example 1

Tests were carried out to fabricate bent plate-like resin molded product using the cold runner type injection mold of the present invention shown in FIG. 1 by changing the used resin, mold temperature, clearance of the sliding portion between the inner surface of the resin reservoir and the outer periphery of the cut punch.

The thicknesses of the product forming portion, the communicating portion and the resin reservoir (at the time of injection) of the injection mold used for the tests were as follows.

| | |
|---|---|
| Thickness of product forming portion (cavity 10) | 1.5 mm |
| Thickness of communicating portion (11) | 0.5 mm |
| Thickness of resin reservoir (12) at the time of injection | 1.0 mm |

In the tests, the cutting quality given by the cut punch and associated problems are evaluated based on the following criteria. The results are shown in Table 1.

Cutting quality evaluation criteria:

○ Satisfactory without cracks and burrs at cut end

Δ Acceptable in terms of external appearance although with some cracks and burrs at cut end X Defective with cracks and burrs at cut end Problems:

K Unsatisfactory in terms of mold durability because of scorings at sliding portion B Burring at cut end of molded product H Whitening at cut end of molded product or cutting of molded product impossible

TABLE 1

| Used resin | Mold temperature | Clearance | Cutting quality | Problems |
|---|---|---|---|---|
| GPPS | 50° C. | Less than 5 μm | ○ | K |
| | | 5 to 20 μm | ○ | None |
| | | more than 20 μm | Δ To X | B |
| PC | 90° C. | Less than 5 μm | ○ | K |
| | | 5 to 20 μm | ○ | None |
| | | more than 20 μm | ○ | None |
| PA | 70° C. | Less than 5 μm | ○ | K |
| | | 5 to 20 μm | ○ | None |
| | | more than 20 μm | Δ To X | B |

Notes:
GPPS: General-purpose polystyrene
PC: Polycarbonates
PA: Polyamides

It can be said from the results shown in Table 1 that narrower clearances of the sliding portion between the inner surface of the resin reservoir and the outer periphery of the cut punch provide a better cutting quality, but too narrow a clearance makes it easy to bring the cut punch into contact with the resin reservoir, and this is not desirable in terms of mold durability. Particularly, if the clearance of the sliding portion is less than 5 μm, a mold of high accuracy must be used to avoid the mold durability problem, and this increases the cost for the mold and hence is not desirable economically. Therefore, when economic advantages are considered, it is desirable to optimize the clearance in accordance with the resin properties used. It has been verified from the results shown in Table 1 that clearances of 10 to 20 μm are preferred for GPPS and PC, whereas clearances of 5 to 10 μm are preferred for PA.

Further, tests were carried out to fabricate bent plate-like resin molded products using the same mold by changing the used resin, mold temperature and cut punch drive timing to evaluate the cutting quality given by the cut punch and associated problems under the same criteria. The results are summarized in Table 2. "Drive timing" means a time interval (in seconds) from injection completion (pressure holding start) to cut punch drive start.

TABLE 2

| Used resin | Mold temperature | Clearance | Driving Timing (sec) | Cutting quality | Problems |
|---|---|---|---|---|---|
| GPPS | 50° C. | 10 μm | Less than 0.5 | X | B |
| | | | 0.5 to 1.5 | ○ | None |
| | | | more than 1.5 | X | H |
| PC | 90° C. | 10 μm | Less than 0.8 | X | B |
| | | | 0.8 to 2.5 | ○ | None |
| | | | more than 2.5 | X | H |
| PA | 70° C. | 10 μm | Less than 1.5 | X | B |
| | | | 1.5 to 2.5 | ○ | None |
| | | | more than 2.5 | X | H |

It can be said from the results shown in Table 2 that the cut punch drive timing differs depending on the resin properties. What is common to the above three kinds of resins is that an early cut punch drive timing produces burrs at the cut ends and a late cut punch drive timing produces whitening and a further late timing makes it impossible to cut the products.

Test Example 2

Tests were carried out to fabricate thin annular parts by using the hot runner type injection mold of the present invention shown in FIG. 8 and using PA as a resin at a mold temperature of 70° C. and by changing the clearance of the sliding portion between the inner surface of the resin reservoir and the outer periphery of the cut punch to obtain cut punch driving timings that can give satisfactory cutting quality. The results are shown in Table 3.

The thicknesses of the product forming portion, the communicating portion and the resin reservoir (at the time of injection) of the injection mold used for the tests were as follows.

Thickness of product forming portion (cavity 56*a*) 0.17 mm

Thickness of communicating portion (57*a*) 0.17 mm

Thickness of resin reservoir (58*a*) at the time of injection 0.5 mm

TABLE 3

| Used resin | Mold temperature | Clearance | Driving timing (sec) |
| --- | --- | --- | --- |
| PA | 70° C. | 5 μm | 0.2 to 1.4 |
| | | 10 μm | 0.4 to 1.5 |
| | | 15 μm | 1.5 to 1.6 |
| | | more than 20 μm | No range |

It can be said from the results shown in table 3 that narrower clearances of the sliding portion between the inner surface of the resin reservoir and the outer periphery of the cut punch provide a wider drive timing range for giving satisfactory cutting quality, whereas wider clearances provide a narrower drive timing range for giving satisfactory cutting quality. Further, too narrow a clearance makes it easy to bring the cut punch into contact with the resin reservoir similarly to Test Example 1, which is not desirable in terms of mold durability. When PA is used as a resin, a clearance of 15 μm makes the cutting quality-optimizing drive timing as short as 0.1 sec, and this is not desirable in terms of stable production. Further, a clearance of 20 μm provides no drive timing range that can optimize the cutting quality. Therefore, the optimal cut punch drive timing that can give satisfactory clearance and cutting quality differs depending on the resin properties.

Further, tests were carried out to fabricate thin annular parts by using the same mold and using PA as a resin at mold temperatures of 60 and 80° C. by changing the thickness of the resin reservoir to obtain cut punch drive timings for giving satisfactory cutting quality. The results are shown in Tables 4 and 5.

TABLE 4

| Used resin | Mold temperature | Clearance | Resin reservoir thickness (mm) | Driving timing (sec) |
| --- | --- | --- | --- | --- |
| PA | 60° C. | 10 μm | 0.2 | 0.1 to 0.2 |
| | | | 0.25 | 0.1 to 0.3 |
| | | | 0.5 | 0.3 to 1.2 |
| | | | 1.0 | 0.5 to 2.0 |
| | | | 1.7 | 0.5 to 2.5 |

TABLE 5

| Used resin | Mold temperature | Clearance | Resin reservoir thickness (mm) | Driving timing (sec) | Thickness ratio resin reservoir to communicating portion |
| --- | --- | --- | --- | --- | --- |
| GPPS | 10° C. | 10 μm | 0.2 | 0.1 to 0.2 | 1.2 |
| PA | | | 0.25 | 0.1 to 0.4 | 1.5 |
| | | | 0.35 | 0.3 to 1.0 | 2.0 |
| | | | 0.5 | 0.5 to 1.7 | 2.5 |
| | | | 1.0 | 0.6 to 2.5 | 5.9 |
| | | | 1.7 | 0.6 to 2.9 | 10 |

It is understood from the results shown in Tables 4 and 5 that thicker resin reservoirs provide a wider range of cut punch drive timings for giving satisfactory cutting quality. Further, thickness ratios between the resin reservoir and the communicating portion of 1.5 or less cannot provide an adequately wide drive timing range, which imposes problems in terms of stable production. Still further, the resin in the resin reservoir is scrapped every molding cycle, and thus is a waste. Therefore, there is no need to have a drive timing range wider than necessary, and thus from the viewpoint of cut punch driving controllability and effective use of resources, it is understood that the thickness of the resin reservoir should preferably range from 1.5 to 10 times the thickness of the communicating portion, or more preferably from about 2 to 6 times.

INDUSTRIAL APPLICABILITY

As described in the foregoing, the injection molding method of the present invention can provide the following advantages.

(1) When the resin is injected and charged, the resin material in the resin reservoir solidifies from its outside surface, and at the time the resin material in the communicating portion that communicates with the cavity has solidified, the molten resin material remains in the resin reservoir since the resin reservoir is deeper than the communicating portion. When the cut punch is driven under such condition, the molten resin material in the resin reservoir can flow backward into the runner via the gate. As a result, the volume of the resin in the resin reservoir can be reduced, so that the moving stroke of the cut punch can be provided. Hence, the method of the present invention can eliminate the use of a complicated structure of the conventional mold, e.g., a moving sprue bush employed in a mold for fabricating optical disk substrates. That is, the method of the present invention can simplify the mold structure.

(2) If the resin reservoir is considered as part of a product, the gate in the mold of the present invention functions as a gate in an ordinary mold. Therefore, by adding only a cut punch drive system, the mold of the present invention can be designed to have a structure as simple as that of the conventional mold. As a result, the design of a multicavity mold can be similar to that of the conventional example, and thus becomes easy. Still further, even if a hot runner type is employed, the structure of the mold of such type can be designed as simple as that of a conventional example. Therefore, a commercially available hot runner system can be directly used, and thus an inexpensive mold can be provided.

(3) The solidified (or semi-solidified) resin material in the communicating portion is cut away. Therefore, the cut end has no burrs into which the molten resin can creep, and thus a resin molded product having no gate marks can be obtained. Further, since the molten resin does not creep into the cut end, an adequate clearance between the cut punch and the resin reservoir into which the cut punch is inserted can be provided, and thus the user does not have to worry about scorings at this portion. Hence, a durable mold can be provided and mold parts can be fabricated inexpensively.

The invention claimed is:

1. An injection molding method comprising:

injecting a molten resin material into a cavity defined by a fixed die and a movable die via a runner provided in the fixed die and a gate provided in the fixed die, wherein when the molten resin material is being charged into the cavity through the resin reservoir from the gate, a cut punch, which is provided in the side of the movable die that confronts the gate through a resin reservoir formed by recessing the fixed die toward the gate and which is movably provided so that the cut punch is inserted into the resin reservoir so as to be in slidable contact with the resin reservoir, has a distal end thereof extending in a moving direction thereof that is toward the resin reservoir of the cut punch, and the distal end is located between the resin reservoir and the cavity at such a position as to open a communicating portion that allows the resin reservoir and the cavity to communicate with each other so that the molten resin material is introduced into the cavity via the resin reservoir;

wherein when an inner portion of the resin material that is present in the resin reservoir is still molten and a portion of the resin material thereof that is in direct contact with the cooled dies is gradually solidified after the molten resin material has been charged into the cavity and the resin reservoir, the cut punch moves toward the gate so that the cut punch is inserted into the resin reservoir, whereby the cut punch not only closes the communicating portion while forcibly pushing the still molten resin material present in the resin reservoir back into the gate, but also cuts the resin material at the communicating portion so that a resin molded product formed in the cavity is separated from a resin solidified portion formed in the resin reservoir, and wherein an undercut portion provided at a periphery of the distal end of the cut punch, the undercut portion disposed closer to an edge portion of the distal end than a center portion of the distal end, retains the resin solidified portion in the resin reservoir.

2. An injection molding method according to claim 1, wherein a plurality of resin molded products are molded by a plurality of the cavities, the resin reservoirs and the cut punches.

3. An injection molding method according to claim 1 or 2, wherein that the runner is a hot runner.

4. An injection molding method according to claim 3, wherein the hot runner has a valve gate structure, in which a valve gate is closed to close the gate after the cut punch has moved.

5. An injection molding method according to claim 1, wherein a resin molded product having an opening is molded by a resin reservoir and the cut punch inserted into the resin reservoir, the resin reservoir being provided so as to correspond to a shape of the opening of the resin molded product.

6. The injection molding method according to claim 1, wherein a depth as viewed in a moving direction of the cut punch in the resin reservoir is 1.5 to 10 times an opening distance of the communicating portion.

7. An injection molding method comprising:

injecting molten resin material via a runner to flow from an injection nozzle located in a fixed die, through a gate and into a resin reservoir, and to further flow into a cavity via a communication portion, the communication portion being located between the resin reservoir and the cavity; and forming a resin molded product in the cavity by closing the communication portion so that the resin molded product formed in the cavity is separated from a resin solidified portion formed in the resin reservoir and retaining the resin solidified portion in an undercut portion formed on a periphery of a distal end of a cut punch, the undercut portion disposed closer to an edge portion of the distal end than a center portion of the distal end, wherein, the communication portion is closed by advancing the cut punch from a movable die portion through the resin reservoir towards the gate portion, the cut punch provided in the side of the movable die that confronts the gate and being in slidable contact with the resin reservoir, and wherein, the closing is performed when an inner portion of the resin material present in the resin reservoir is still molten and a portion of the resin material in both the resin reservoir and the cavity, which are in contact with the fixed and movable die, is partially solidified, the cut punch pushing the molten inner portion still present in the resin reservoir back into the gate.

8. The injection molding method according to claim 7, further comprising removing the resin solidified portion attached to the cut punch using a pushing device, the pushing device being slidably mounted inside the cut punch, so as to be independent of the cut punch, wherein the resin solidified portion is formed from the resin remaining in the resin reservoir after the communication portion has been closed.

9. The injection molding method according to claim 7, wherein a depth as viewed in a moving direction of the cut punch in the resin reservoir is 1.5 to 10 times an opening distance of the communicating portion.

* * * * *